(12) United States Patent
Oki et al.

(10) Patent No.: US 8,241,525 B2
(45) Date of Patent: Aug. 14, 2012

(54) METHOD FOR PRODUCING COMPOSITE MATERIAL FOR POSITIVE ELECTRODE OF LITHIUM BATTERY

(75) Inventors: Kazuo Oki, Wakayama (JP); Yasuhisa Fukumoto, Wakayama (JP); Ryuichi Akagi, Wakayama (JP); Kenichi Nishimura, Wakayama (JP)

(73) Assignee: KAO Corporation, Tokyo (JP)

( * ) Notice: Subject to any disclaimer, the term of this patent is extended or adjusted under 35 U.S.C. 154(b) by 502 days.

(21) Appl. No.: 12/303,933

(22) PCT Filed: Jun. 27, 2007

(86) PCT No.: PCT/JP2007/062847
§ 371 (c)(1),
(2), (4) Date: Dec. 8, 2008

(87) PCT Pub. No.: WO2008/001792
PCT Pub. Date: Jan. 3, 2008

(65) Prior Publication Data
US 2010/0230641 A1 Sep. 16, 2010

(30) Foreign Application Priority Data

Jun. 27, 2006 (JP) .................................. 2006-176852
Jun. 27, 2006 (JP) .................................. 2006-176862

(51) Int. Cl.
*H01B 1/04* (2006.01)
(52) U.S. Cl. ................... 252/502; 252/182.1; 252/186.2; 429/218.1; 429/231.8; 429/231.95; 429/232
(58) Field of Classification Search .................. 252/500, 252/512, 182.1, 186, 502; 429/224, 231.8, 429/231.95, 232
See application file for complete search history.

(56) References Cited

U.S. PATENT DOCUMENTS

2001/0026892 A1 * 10/2001 Cho et al. ....................... 429/224
2002/0168574 A1 * 11/2002 Ahn et al. ...................... 429/232

FOREIGN PATENT DOCUMENTS

| JP | 4-162357 A | | 6/1992 |
| JP | 5-29022 A | | 2/1993 |
| JP | 06-068869 | * | 3/1994 |
| JP | 8-138678 A | | 5/1996 |
| JP | 11-176446 | * | 7/1999 |

(Continued)

OTHER PUBLICATIONS

Office Action dated Jul. 19, 2010 in Chinese Application No. 200780023758.5.

(Continued)

*Primary Examiner* — Khanh Tuan Nguyen
(74) *Attorney, Agent, or Firm* — Birch, Stewart, Kolasch & Birch, LLP

(57) ABSTRACT

The present invention provides a method for producing a composite material for positive electrodes of lithium batteries which is particularly excellent in high-rate discharge characteristics. The method for producing a composite material for positive electrodes of lithium batteries, contains: a dispersing step of dispersing at least the positive electrode active material and the conductive material 1 in a solvent to be in a forcibly dispersed state; and a composite particle-forming step of obtaining composite particles containing the positive electrode active material and the conductive material 1 by a process for agglutinating the conductive material 1 together with the positive electrode active material in the solvent or by a process for removing the solvent.

21 Claims, 1 Drawing Sheet

FOREIGN PATENT DOCUMENTS

| | | | |
|---|---|---|---|
| JP | 11-176446 A | | 7/1999 |
| JP | 2001-126733 | * | 5/2001 |
| JP | 2001-126733 A | | 5/2001 |
| JP | 2001-328813 A | | 11/2001 |
| JP | 2003-292309 A | | 10/2003 |
| JP | 2003-331823 A | | 11/2003 |
| JP | 2004-14519 A | | 1/2004 |
| JP | 2004-103392 A | | 4/2004 |
| JP | 2004-179019 A | | 6/2004 |
| JP | 2005-268066 A | | 9/2005 |
| JP | 2007-169139 A | | 7/2007 |

OTHER PUBLICATIONS

Chinese Office Action issued on Apr. 14, 2011 in Chinese Patent Application No. 200780023758.5 with English translation.

* cited by examiner

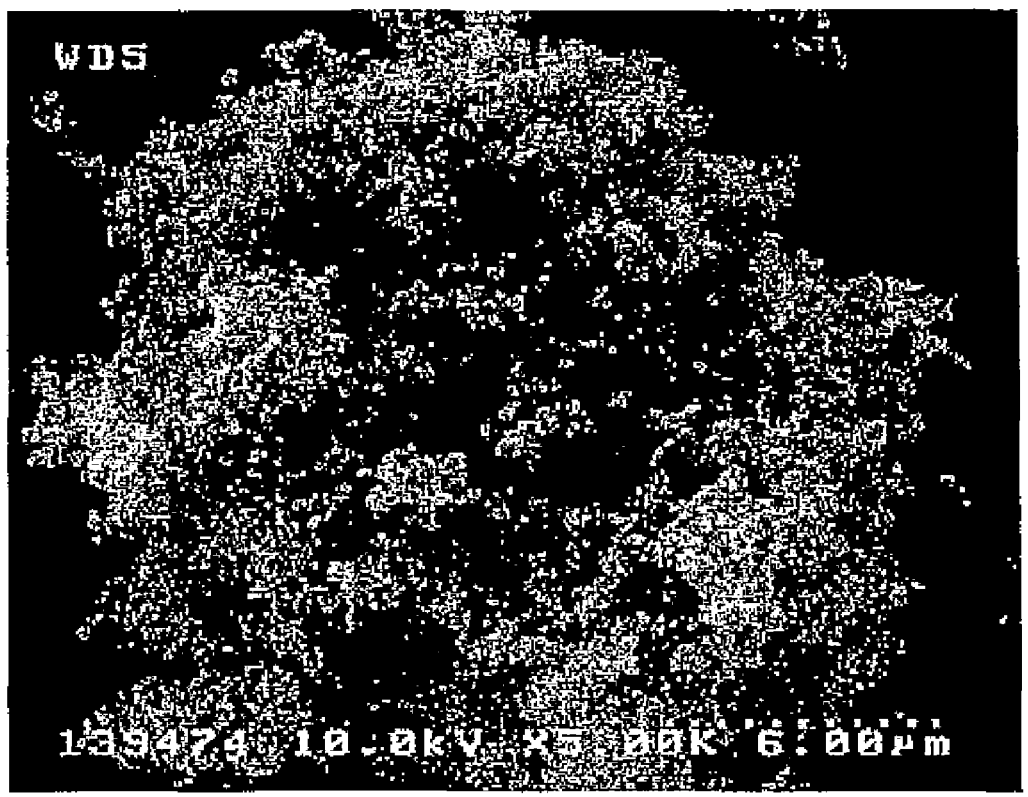

METHOD FOR PRODUCING COMPOSITE MATERIAL FOR POSITIVE ELECTRODE OF LITHIUM BATTERY

TECHNICAL FIELD

The present invention relates to a method for producing a composite material for positive electrodes of lithium batteries containing a positive electrode active material and a conductive material. The composite material for positive electrodes of lithium batteries obtained in the present invention can be suitably used for forming positive electrodes of lithium ion secondary batteries or the like.

BACKGROUND ART

Attentions have been recently focused on electromobiles, hybrid automobiles and fuel cell electric vehicles or the like due to the rising price of petroleum resources and rising international earth environment protection movement, and they have been partially put in practical use. Secondary batteries as an auxiliary power or the like are essential for these driver systems. In addition, high output secondary batteries capable of responding to the sudden starting and sudden acceleration of automobiles are desired. Alternatively, secondary batteries having high energy density are desired from the viewpoint of weight load to the automobiles and enhancement in fuel consumption. Because of these factors, lithium ion secondary batteries having the highest energy density in the secondary batteries and capable of expressing high output have been highly expected.

The lithium ion secondary battery, which uses an electrolysis solution containing a nonaqueous solvent containing lithium salts, has a structure where a positive electrode and a negative electrode are separated by a separator, the positive electrode provided with a positive electrode active material, the negative electrode provided with a negative electrode active material. Alternatively, since the conductivity of the positive electrode active material itself in the positive electrode is low, conductive materials such as carbon black are added in order to enhance the conductivity.

The above positive electrodes are generally produced by applying a slurry obtained by mixing active materials such as $LiMn_2O_4$, conductive materials such as carbon black, a binder, and a solvent onto a metallic foil as a current collector and drying the slurry. As a result, the fine structure of the positive electrode has a structure where particles made of a positive electrode active material having low conductivity and particles made of a conductive material having a particle diameter smaller than that of the particles made of the positive electrode active material are dispersed and combined.

In the positive electrode of the lithium ion secondary battery, lithium is stored in the positive electrode active material in discharging. In that case, electric discharge is advanced by the operation of lithium ions diffused to the positive electrode side and electrons electrically conducted from a positive electrode current collector. Alternatively, the electrons and ionized lithium are emitted from the positive electrode active material in charging. Therefore, the selection of a conductive material having high conductivity and the fine composite structure of the positive electrode active material and conductive material as factors which affect the characteristics, particularly high-rate discharge characteristics (high output) of the battery are very important.

For such reasons, some enhancements of the fine composite structure for the positive electrode have been attempted. For example, Patent Document 1 proposes a positive electrode material in which the surface of the positive electrode active material is covered with a conductive material in a covering rate of 15% or more by a process for mixing the positive electrode active material with the conductive material to apply a compression shearing stress in a dry state. Alternatively, Patent Document 1 discloses that graphite having a particle diameter of 1 to 20 μm is added when a positive electrode is produced using the positive electrode material.

Alternatively, a method for producing a positive electrode composite material by wet-mixing has been also known. For example, Patent Document 2 proposes a producing method for wet-mixing ferrous phosphate hydrate, phosphate lithium and a carbonaceous material precursor, removing a solvent to obtain a mixture, and grinding and firing the mixture to produce a carbon composite material.

Alternatively, Patent Document 3 attempts the improvement of a conductive path by adding carbon fiber into a positive electrode active material.

Furthermore, Patent Document 4 proposes a positive electrode formed of a composite material obtained by adding both carbon black and carbon fiber into a positive electrode active material and mixing the carbon fiber, the carbon black and the positive electrode active material.

[Patent Document 1] Japanese Patent Application Laid-Open No. 2004-14519
[Patent Document 2] Japanese Patent Application Laid-Open No. 2003-292309
[Patent Document 3] Japanese Patent Application Laid-Open No. 2004-103392
[Patent Document 4] Japanese Patent Application Laid-Open No. 2004-179019

DISCLOSURE OF THE INVENTION

Problems to be Solved by the Invention

However, the positive electrode material disclosed in Patent Document 1 is difficult to control the covering rate, and the surface of the positive electrode active material tends to be precisely covered with the conductive material. Therefore, the path of Li ions is blocked, and as a result, the high-rate discharge characteristics are difficult to be enhanced. Alternatively, it was confirmed that although the conductivity of the positive electrode active material is enhanced by covering the conductive material, the conductivity of the obtained positive electrode is insufficient, and that the enhancement effect of the conductivity is not so large even when making combination use of graphite.

Alternatively, in the method for producing the carbon composite material described in Patent Document 2, carbonaceous material precursors such as polyethyleneglycol are used without using conductive materials such as carbon black to obtain a mixture, and the mixture is then ground, and fired. For this reason, it is difficult to control the fine composite structure of the obtained carbon composite material, and it is highly unlikely that the high-rate discharge characteristics of the positive electrode obtained using the carbon composite material is superior to the positive electrode material described in Patent Document 1.

Since the carbon fiber described in Patent Document 3 generally has poor contact efficiency with the positive electrode active material, the carbon fibers provide insufficient performance for the conductivity or the like of the positive electrode.

Furthermore, since the positive electrode disclosed in Patent Document 4 was formed by dry-mixing the carbon black, the carbon fiber, the positive electrode active material and the binder, adding the solvent, and using a slurry dispersed in the solvent, it was confirmed that the fine composite structure where the positive electrode active material and the conductive material are suitably arranged cannot be necessarily formed and the obtained positive electrode develops insufficient performance for the high-rate discharge characteristics.

Then, the present invention provides a method for producing a composite material for positive electrodes of lithium batteries which is excellent in high-rate discharge characteristics.

Means for Solving the Problems

A method for producing a composite material for positive electrodes of lithium batteries containing a positive electrode active material and a conductive material according to the present invention, contains: a dispersing step of dispersing at least the positive electrode active material and the conductive material 1 in a solvent to be in a forcibly dispersed state; and a composite particle-forming step of obtaining composite particles containing the positive electrode active material and the conductive material 1 by a process for agglutinating the conductive material 1 together with the positive electrode active material in the solvent or by a process for removing the solvent.

BRIEF DESCRIPTION OF THE DRAWINGS

FIG. 1 shows a scanning electron micrograph of a composite material for positive electrodes obtained in Example 1.

BEST MODE FOR CARRYING OUT THE INVENTION

Hereinafter, an embodiment of the present invention will be described in detail.

The producing method of the present invention is a method for producing a composite material for positive electrodes of lithium batteries containing a positive electrode active material and a conductive material. The producing method contains: a dispersing step of dispersing at least the positive electrode active material and the conductive material 1 in a solvent to be in a forcibly dispersed state; and a composite particle-forming step of obtaining composite particles containing the positive electrode active material and the conductive material 1 by a process for agglutinating the conductive material 1 together with the positive electrode active material in the solvent or by a process for removing the solvent. Since this method provides the composite particles having a composite structure capable of smoothly moving electrons and lithium ions, lithium ion batteries excellent in high-rate discharge characteristics can be provided by using the composite particles.

As embodiments of the producing method of the present invention, there can be exemplified a first to fourth embodiments which will be described below.

A first embodiment is a method for producing a composite material for positive electrodes of lithium batteries, wherein a conductive material having autoagglutination in a solvent is used as the conductive material 1, and the composite particle-forming step agglutinates the conductive material 1 together with the positive electrode active material in the solvent to obtain the composite particles.

The present inventors consider that the producing method of the first embodiment forcibly disperses the conductive material 1 having autoagglutination together with the positive electrode active material in the solvent to constitute a fine composite structure where the agglutinated conductive material 1 wraps around the agglutinated positive electrode active material. The present inventors consider that this increases the number of contact points of the positive electrode active material and conductive material 1 to enhance the conductivity to smooth the permeation of an electrolysis solution and to exhibit a structure excellent in ion diffusion of Li ions.

A second embodiment is a method for producing a composite material for positive electrodes of lithium batteries, wherein a conductive material containing carbon black having a DBP absorption amount of 200 to 800 $cm^3/100$ g and/or fibrous carbon having an aspect ratio of 50 to 1000 is used as the conductive material 1, and the composite particle-forming step agglutinates the conductive material 1 together with the positive electrode active material in the solvent to obtain the composite particles.

The present inventors consider that the producing method of the second embodiment can also constitute a fine composite structure where the agglutinated conductive material 1 wraps around the agglutinated positive electrode active material, and the structure increases the number of contact points of the positive electrode active material and conductive material 1 to enhance the conductivity. In addition, the present inventors consider that the structure can establish a porous carbon network having minute spaces to smooth the permeation of the electrolysis solution and to exhibit a structure which is more excellent in ion diffusion of Li ions.

A third embodiment is a method for producing a composite material for positive electrodes of lithium batteries, wherein the composite particle-forming step removes the solvent from a slurry obtained in the dispersing step to obtain the composite particles containing the positive electrode active material and the conductive material 1, and the method further contains a mixing step of mixing at least the composite particles and a conductive material 2 having an aspect ratio of 2 to 10 after the composite particle-forming step.

The producing method of the third embodiment mixes the conductive material having a specific aspect ratio with the composite particles obtained by removing the solvent of the slurry in which the positive electrode active material and the conductive material are dispersed. Therefore, the present inventors consider that the conductive material is surely stuck (partly stuck) to the surface of the positive electrode active material to exhibit a fine composite structure where the conductive material having a specific aspect ratio is interposed between the composite particles. Thereby, electrons sufficiently and electrically conducted to the surface of the positive electrode active material through the stuck conductive material to enhance the conductivity. Alternatively, the present inventors consider that the amount of the conductive material stuck on the surface of the positive electrode active material can be controlled, and the interposition of the conductive material having a specific aspect ratio smoothes the permeation of the electrolysis solution to provide a structure excellent in ion diffusion of Li ions. As a result, the present inventors consider that that electric current higher than that of the conventional Li ion secondary battery can be applied in discharging to provide Li ion batteries excellent in high-rate discharge characteristics.

A fourth embodiment is a method for producing a composite material for positive electrodes of lithium batteries, wherein the composite particle-forming step removes the solvent from a slurry obtained in the dispersing step to obtain the composite particles containing the positive electrode active material and the conductive material 1, and the method further contains a mixing step of mixing at least the composite particles and the conductive material 2 having a DBP absorption amount of 100 to 500 cm$^3$/100 g after the composite particle-forming step.

The producing method of the fourth embodiment also exhibits the same effects as those of the third embodiment described above.

Hereafter, the first to fourth embodiments will be described in detail. Various kinds of values of physical properties in the present invention are specifically measured by methods described in Examples.

First, the first embodiment will be mainly described. The conductive material 1 and positive electrode active material used in the first embodiment are an aggregate of unit particles which are chemically stable in the solvent. The present inventors consider that the conductive material 1 and the positive electrode active material are forcibly dispersed by ultrasonic waves or the like, preferably ultrasonic waves of a frequency of 15 to 25 kHz and an output of 100 to 500 W in the solvent to disperse the conductive material 1 and the positive electrode active material in a state close to the unit particles. This unit particle is referred to as "primary particle" in the present invention.

The first embodiment includes the dispersing step of dispersing at least the conductive material (conductive material 1) having autoagglutination in the solvent and the positive electrode active material in the solvent to be in the forcibly dispersed state. The "forcibly dispersed state" in the present invention means a dispersion state where when the slurry is sampled and diluted to a predetermined concentration, and an average particle diameter is promptly measured by a particle size distribution measuring device, the average particle diameter does not surpass 130% of the primary particle diameter of the positive electrode active material (a specific measuring method will be described later in the measuring method of the primary particle diameter of the positive electrode active material from the viewpoint of the comparison with the primary particle diameter of the positive electrode active material). That is, in this state, the average particle diameter to be measured is close to the primary particle diameter of the positive electrode active material by converting an initial agglutinated state into the forcibly dispersed state (the dispersion state of the conductive material 1 is also reflected by this measured value), and the forcibly dispersed state can be grasped by this phenomenon. "Having autoagglutination in the solvent" means a property in which the average particle diameter is increased by forcibly dispersing the material in the solvent to be used and then leaving the materials to cause the agglutination of the material, and is specifically defined by a measuring method described in Examples.

In the above dispersing step, the conductive material having autoagglutination and the positive electrode active material may be added into the solvent, and be simultaneously dispersed. However, one of the above conductive material and positive electrode active material may be added into the solvent and is dispersed, and the other may be then added thereto and be dispersed.

In the first embodiment, from the particular viewpoint of forcibly dispersing the conductive material having autoagglutination effectively and effectively dispersing the positive electrode active material while maintaining the dispersion state, a method for adding the conductive material into the solvent, dispersing the conductive material, adding the positive electrode active material thereto, and dispersing the positive electrode active material is preferable. It is preferable to uniformly mix the above conductive material and the positive electrode active material in the method for subsequently adding and dispersing the positive electrode active material. It is more preferable to add the positive electrode active material while dispersing the conductive material in a disperser.

The conductive material having autoagglutination may have a property of autoagglutinating when the conductive material is forcibly dispersed in the solvent used for dispersing and is then left. Examples thereof include carbon black having autoagglutination, and fibrous carbon such as carbon fiber having autoagglutination and carbon nanotube (CNT).

In the first embodiment, the conductive material having no autoagglutination can be also added in the dispersing step. In that case, from the viewpoint of forcibly dispersing the conductive material having autoagglutination effectively and effectively dispersing an additional conductive material while maintaining the dispersion state, it is preferable to add the conductive material having autoagglutination into the solvent, disperse the conductive material, add an additional conductive material (preferably a conductive material having no agglutination, and more preferably carbon black having no agglutination) thereto, and disperse the additional conductive material. The additional conductive material and the positive electrode active material may be previously or simultaneously mixed. When the additional conductive material and the positive electrode active material are sequentially added and dispersed, either material can be added first.

When the positive electrode active material and the conductive material are previously mixed, the powders of the positive electrode active material and conductive material may be dry-mixed with each other. However, the powders are preferably wet-mixed in the solvent from the viewpoint of the powders mixed as uniformly as possible. In that case, an additional conductive material is first dispersed, and the positive electrode active material is then preferably added, dispersed and mixed.

As the carbon black, there can be used one produced by any of decomposing methods such as a thermal black method and an acetylene black method, and incomplete combustion methods such as a channel black method, a gas furnace black method, an oil furnace black method, a turpentine soot method and a lamp black method. However, furnace black, acetylene black and ketjen black (registered trademark) are preferably used from the viewpoint of the conductivity, and of these, the ketjen black is more preferable. These may be used either alone or in combination of a plurality of kinds thereof. As the ketjen black, one (an example of the second embodiment) having a DBP (butyl phthalate) absorption amount of 200 to 800 cm$^3$/100 g is preferable from the viewpoint of the autoagglutination in the solvent and the obtained fine composite structure.

It is preferable that the carbon black having autoagglutination has a large structure capable of including and agglutinating the positive electrode active material. The measure of the structure of the carbon black can be determined from the DBP absorption amount. From the viewpoint of good permeating of an electrolysis solution and securement of the diffusion path of Li ions, the DBP absorption amount of the carbon black used is preferably 200 cm$^3$/100 g or more, more preferably 250 cm$^3$/100 g or more, and still more preferably 300 cm$^3$/100 g or more. Alternatively, from the viewpoint of suppressing the reduction in electrode density, the DBP absorption amount is preferably 800 cm$^3$/100 g or less, more preferably 700 cm$^3$/100 g or less, and still more preferably 600 cm$^3$/100 g or less.

That is, since the carbon black having a DBP absorption amount of 200 to 800 cm$^3$/100 g generally has high autoagglutination, and has high capability for autoagglutinating to generate composite particles when the carbon black is forcibly dispersed in the solvent and is then left to cause the autoagglutination, the carbon black can be suitably used in the present invention.

As the carbon black having no autoagglutination, one having a DBP absorption amount of less than 200 cm$^3$/100 g can be preferably used. The present inventors consider that since such carbon black has a structure which is not so much developed, and can be finely dispersed in the solvent comparatively easily, the carbon black, which is interposed between the positive electrode active material and the carbon black having autoagglutination, can further enhance the conductivity. By the same reason, referring to the carbon black having autoagglutination, it is preferable to make combination use of the carbon black having a comparatively small DBP absorption amount and the carbon black having a comparatively large DBP absorption amount for enhancing the conductivity while maintaining the agglutination.

Alternatively, the primary particle diameter of the carbon black having autoagglutination is preferably 10 to 100 nm from the following viewpoint. That is, the primary particle diameter measured by a scanning electron microscope is preferably 10 nm or more, more preferably 15 nm or more, and still more preferably 20 nm or more from the viewpoint of the easiness of primary dispersion. Alternatively, the primary particle diameter is preferably 100 nm or less, more preferably 80 nm or less and still more preferably 50 nm or less from the viewpoint of the easiness of the reagglutination after the dispersion.

The agglutination particle diameter of the carbon black having autoagglutination is preferably 1 to 50 μm from the following viewpoint. That is, in the first and second embodiments, the carbon black and the positive electrode active material are uniformly mixed and dispersed, and then, composite particles including the positive electrode active material can be formed using an autoagglutination force of the carbon black. The agglutination particle diameter of the carbon black having autoagglutination is preferably 1 μm or more, more preferably 5 μm or more, and still more preferably 10 μm or more from such a viewpoint. Alternatively, the agglutination particle diameter is preferably 50 μm or less, more preferably 30 μm or less, and still more preferably 20 μm or less from the viewpoint of the smoothness of the surface of the positive electrode produced using a composite positive electrode material obtained in the present invention.

The content of the carbon black having autoagglutination is preferably 0.2 to 20 parts by weight relative to 100 parts by weight of the positive electrode active material from the following viewpoint. That is, the content is preferably 0.2 part by weight or more relative to 100 parts by weight of the positive electrode active material from the viewpoint of effectively developing the autoagglutination force in the composite particle-forming step, more preferably 0.5 part by weight or more, and still more preferably 1 part by weight or more. Alternatively, the content is preferably 20 parts by weight or less from the viewpoint of the balance of the volume resistivity and total pore volume ratio, more preferably 10 parts by weight or less, and still more preferably 5 parts by weight or less.

When making combination use of the carbon black having no autoagglutination, the content of the carbon black is preferably 0.2 to 20 parts by weight relative to 100 parts by weight of the positive electrode active material from the following viewpoint. That is, the content is preferably 0.2 part by weight or more relative to 100 parts by weight of the positive electrode active material from the viewpoint of reducing the volume resistivity of a positive electrode material, more preferably 0.5 part by weight or more, and still more preferably 1 part by weight or more. Alternatively, the content is preferably 20 parts by weight or less from the viewpoint of the covering property to the surface of the positive electrode active material, more preferably 10 parts by weight or less, and still more preferably 5 parts by weight or less.

On the other hand, as the fibrous carbon in the first and second embodiments, there are suitably used carbon fiber obtained from a polymer typified by polyacrylonitrile (PAN) as a raw material, pitch-based carbon fiber obtained from pitch as a raw material, vapor phase epitaxy-based carbon fiber (for example, VGCF: registered trademark) that is a carbon nanotube (a cylindrical-shaped object ("Biryushi Kougaku Taikei, Volume I, 1st edition, pp. 651, Fujitec Corporation) formed by winding a sheet of graphite, i.e., a graphene sheet) and that is obtained from hydrocarbon gas as a raw material, and so-called a narrowly-defined carbon nanotube (hereinafter, the narrowly-defined carbon nanotub is merely referred to as carbon nanotube) obtained by an arc discharge method, a laser evaporating method and a chemistry vapor growth method or the like. The fibrous carbon having a thin fiber diameter is preferable from the viewpoint of constructing more conductive paths. The VGCF and the carbon nanotube are suitably used, and of these, the carbon nanotube is preferably used. The carbon nanotube can be obtained by, for example, an arc discharge method for evaporating a graphite electrode by arc discharge under atmosphere gas such as He, Ar, $CH_4$ and $H_2$, an arc discharge method for evaporating a graphite electrode including metal catalysts such as Ni, Co, Y, Fe by arc discharge, a laser evaporating method for applying YAG laser to graphite with which metal catalysts such as Ni—Co and Pd—Rd are mixed to evaporate the graphite and sending out the graphite to an electric furnace heated at about 1200° C. by Ar current, and an HiPCO method for thermally decomposing carbon monoxide at a high pressure using pentacarbonyl iron (Fe(CO)$_5$) for a catalyst, or the like. Referring to the aspect ratio of the carbon nanotube, for example, the smaller the concentration ratio of hydrocarbon (benzene or the like) to atmosphere gas such as hydrogen gas is, the thinner the diameter of the carbon nanotube to be produced is, and the larger the aspect ratio is. Alternatively, the shorter the reaction time is, the thinner the diameter of the carbon nanotube to be produced is, and after all, the larger the aspect ratio is.

The present inventors consider that the fibrous carbon agglutinated in the shape of incidental looping by entangling fibers is dispersed by applying a dispersing agent and a mechanical stress in the presence of the positive electrode active material, and the fibrous carbon is then reagglutinated by stopping the dispersion to enable the formation of the composite particles including the positive electrode active material in the first and second embodiments. The aspect ratio of the fiber diameter (W) to the fiber length (L) of the fibrous carbon, i.e., L/W, becomes important from such a viewpoint. Furthermore, the aspect ratio of the fibrous carbon is preferably 50 or more from the viewpoint of the conductivity, more preferably 100 or more, and still more preferably 200 or more. The aspect ratio is preferably 20,000 or less from the viewpoint of the dispersibility of the fibrous carbon, more preferably 5000 or less, still more preferably 1000 or less, and yet still more preferably 600 or less.

That is, since the fibrous carbon having an aspect ratio of 50 to 20000 generally has high autoagglutination, and has high capability for autoagglutinating to generate the composite particles when the fibrous carbon is forcibly dispersed in the solvent and is then left to cause the autoagglutination, the fibrous carbon can be suitably used in the present invention.

In that case, the fiber length of the fibrous carbon is preferably no less than 50 nm and no more than 50 μm from the following viewpoint. That is, the fiber length is preferably 50 nm or more from the viewpoint of the fibrous carbon brought into contact with the surface of the positive electrode active material much more to establish a conductive path, more preferably 500 nm or more, and still more preferably 1 μm or more. The fiber length is preferably 50 μm or less from the viewpoint of the smoothness of the surface of a positive electrode produced using the composite positive electrode material of the present invention, more preferably 30 μm or less, and still more preferably 10 μm or less.

Alternatively, the fiber diameter of the fibrous carbon is preferably 1 nm to 1 μm from the viewpoint of the fibrous carbon brought into contact with the surface of the positive electrode active material much more to establish a conductive path, more preferably 1 to 500 nm, and still more preferably 1 to 300 nm.

The content of the fibrous carbon is preferably 0.2 to 20 parts by weight relative to 100 parts by weight of the positive electrode active material from the following viewpoint. That is, the content is preferably 0.2 part by weight or more relative to 100 parts by weight of the positive electrode active material from the viewpoint of effectively developing the autoagglutination force in the composite particle-forming step, more preferably 0.5 part by weight or more, and still more preferably 1 part by weight or more. Alternatively, the content is preferably 20 parts by weight or less from the viewpoint of the balance of the volume resistivity and total pore volume ratio, more preferably 10 parts by weight or less, and still more preferably 5 parts by weight or less.

The total compounding amount of carbon is preferably 0.2 to 50 parts by weight relative to 100 parts by weight of the positive electrode active material from the following viewpoint. That is, the amount is preferably 0.2 part by weight or more relative to 100 parts by weight of the positive electrode active material from the viewpoint of reducing the volume resistivity of the composite positive electrode material, more preferably 0.5 part by weight or more, and still more preferably 3 parts by weight or more. Alternatively, the amount is preferably 50 parts by weight or less from the viewpoint of enhancing the energy density of the composite positive electrode material, more preferably 30 parts by weight or less, and still more preferably 15 parts by weight or less.

As the positive electrode active material in the first and second embodiments, any conventionally known materials can be used. Examples thereof include Li—Mn-based composite oxides such as $LiMn_2O_4$, Li—Co-based composite oxides such as $LiCoO_2$, Li—Ni-based composite oxides such as $LiNiO_2$, Li—Fe-based composite oxides such as $LiFeO_2$, and the like. The other examples include $Li_xCoO_2$, $Li_xNiO_2$, $MnO_2$, $LiMnO_2$, $Li_xMn_2O_4$, $Li_xMn_{2-y}O_4$, $\alpha$-$V_2O_5$, and $TiS_2$. Of these, $LiMn_2O_4$, $LiCoO_2$ and $LiNiO_2$ are preferable from the viewpoint of excellent thermal stability, capacity and output characteristics, and $LiMn_2O_4$ is more preferable.

The primary particle diameter of the positive electrode active material is preferably 0.1 to 10 μm from the following viewpoint. That is, the primary particle diameter is preferably 0.1 μm or more from the viewpoint of the safety, stability and cycle characteristics of the positive electrode active material, more preferably 0.2 μm or more, and still more preferably 0.3 μm or more. Alternatively, the primary particle diameter is preferably 10 μm or less from the viewpoint of composite agglutination in the composite particle-forming step, reactivity and high-rate discharge characteristics, more preferably 5 μm or less, and still more preferably 2 μm or less.

As the solvent used for dispersing, N-methyl-2-pyrolidone (NMP, boiling point: 202° C.), dimethylformamide (DMF, boiling point: 153° C.), dimethylacetamide (boiling point: 165° C.), methyl ethyl ketone (boiling point: 79.5° C.), tetrahydrofuran (boiling point: 66° C.), acetone (boiling point: 56.3° C.), ethanol (boiling point: 78.3° C.) and ethyl acetate (boiling point: 76.8° C.) or the like are suitably used. Of these, NMP having high boiling point is preferably used as the solvent when obtaining the composite particles in a slurry state. Alternatively, methyl ethyl ketone and ethanol having low boiling point are preferable when obtaining the composite particles in a drying particle state.

The boiling point of the solvent is preferably 250° C. or less from the viewpoint of the easiness of drying, more preferably 100° C. or less, and still more preferably 80° C. or less.

The amount of the solvent to be used is preferably 100 parts by weight or more relative to 100 parts by weight of the positive electrode active material from the viewpoint of uniformly dispersing the conductive material having autoagglutination and the positive electrode active material or the like, and more preferably 200 parts by weight or more. Alternatively, the amount is preferably 1000 parts by weight or less from the viewpoint of the complication for drying the solvent and the concentration of the slurry to be obtained, and more preferably 800 parts by weight or less. Piecing together the above viewpoints, the amount is preferably 100 to 1000 parts by weight, and more preferably 200 to 800 parts by weight.

In the dispersing step, a method for dispersing the conductive material 1 and the positive electrode active material in the solvent using the disperser, a method for dispersing the conductive material 1 and the positive electrode active material using the dispersing agent, or the like are used as the method for dispersing the conductive material 1 and the positive electrode active material. However, any case includes a dispersing step of dispersing the conductive material 1 and the positive electrode active material in the solvent to be in a forcibly dispersed state. The positive electrode active material is preferably dispersed in a primary particle state in the forcibly dispersed state. Alternatively, when the conductive material 1 is carbon black having a DBP absorption amount of 200 $cm^3$/100 g or more, the conductive material 1 is also preferably dispersed in a primary particle state or in a state close to the primary particle.

Examples of the dispersers include an ultrasonic type disperser, a stirring type disperser, a high speed rotating shear type disperser, a mill type disperser, and a high-pressure injection type disperser. When the disperser is used in the step forcibly dispersing, the ultrasonic type disperser and the high-pressure injection type disperser are suitably used.

The method for dispersing using the dispersing agent is effective as a method for dispersing the positive electrode active material and the conductive material having low autoagglutination. However, the dispersing agent is preferably used in the range of the additive amount which does not inhibit the production of the composite particles in the composite particle-forming step.

When the dispersing agent is used, an anionic, nonionic or cationic surface-active agent, or a polymer dispersing agent can be used as the dispersing agent. However, the polymer dispersing agent is preferably used in view of the dispersion performance.

Various compounds can be used as the polymer dispersing agent. However, a polycarboxylic acid-based polymer dispersing agent having a plurality of carboxyl groups in a molecule, a polyamine-based polymer dispersing agent having a plurality of amino groups in a molecule, a polymer dispersing agent containing a plurality of amide groups in a molecule, and a polymer dispersing agent having a plurality of polycyclic aromatic compounds in a molecule are preferable. These dispersing agents may be used either alone or in combination of a plurality of kinds thereof.

Furthermore, the first and second embodiments include the composite particle-forming step of agglutinating the conductive material 1 together with the positive electrode active material in the solvent to obtain the composite particles. This composite particle-forming step (hereinafter, occasionally referred to as "agglutination step") can use a technique for stopping a disperser to accelerate the autoagglutination of the conductive material to obtain a slurry containing the composite particles (hereinafter, occasionally referred to as "agglutination particles") since the conductive material having autoagglutination autoagglutinates easily, or a technique for distilling a solvent and forcibly agglutinate the conductive material to obtain a powder of the agglutination particles in order to further enhance an agglutination force in the solvent.

It is preferable that the agglutination particles to be obtained have a shape in which the positive electrode active material is surrounded by the conductive material 1. The average particle diameter of the agglutination particles to be obtained is preferably 1 to 20 μm from the following viewpoint. That is, the average particle diameter in the powder state of such agglutination particles or in the solvent is preferably 1 μm or more, more preferably 3 μm or more, and still more preferably 5 μm or more. Alternatively, the average particle diameter is preferably 20 μm or less from the viewpoint of the surface property of the positive electrode obtained using the composite particles, more preferably 15 μm or less, and still more preferably 10 μm or less.

The concentration of the agglutination particles in the agglutination step is preferably 2 to 100% by weight in the slurry from the viewpoint of suitably obtaining the agglutination particles, more preferably 5 to 50% by weight, and still more preferably 10 to 40% by weight.

Since the composite material for positive electrodes after distilling the solvent can reduce the volume resistivity in the compounding amount of the conductive material fewer than the conventional composite material for positive electrodes, and thus can compound a large amount of a positive electrode active material, the energy density of the positive electrode can be enhanced. In that case, the volume resistivity of the composite material for positive electrodes is preferably 3 Ω·cm or less, more preferably 2 Ω·cm or less, and still more preferably 1.8 Ω·cm or less from the viewpoint of enhancing the high-rate discharge characteristics.

Alternatively, the total pore volume of the composite material for positive electrodes after distilling the solvent is preferably 0.8 to 25 cc/g from the following viewpoint. That is, the total pore volume is preferably 0.8 cc/g or more from the viewpoint of enhancing the high-rate discharge characteristics, more preferably 0.9 cc/g or more, and still more preferably 1 cc/g or more. The total pore volume is preferably 25 cc/g or less from the viewpoint of appropriately securing the energy density of the positive electrode, more preferably 10 cc/g or less, and still more preferably 5 cc/g or less. Piecing together the above viewpoints, the total pore volume is preferably 0.8 to 25 cc/g, more preferably 0.9 to 10 cc/g, and still more preferably 1 to 5 cc/g. The present inventors consider that such a total pore volume can smooth the diffusion of the Li ions.

The positive electrode active materials obtained in the first and second embodiments can be obtained as a slurry or a powder. Positive electrodes for lithium ion secondary batteries or the like can be formed using the slurry or the powder. In that case, a conductive material may be further added from the viewpoint of enhancing the conductivity of the positive electrode. All of the carbon black, carbon fiber and carbon nanotube or the like used for forming the composite material for positive electrodes can be used as such a conductive material. The carbon black having a DBP absorption amount of 100 to 800 $cm^3/100$ g is preferable from the viewpoint of enhancing the conductivity of the positive electrode, and ketjen black and acetylene black are particularly preferable.

Next, the third embodiment will be described. The third embodiment includes the composite particle-forming step of removing a solvent from a slurry obtained by dispersing a positive electrode active material and a conductive material 1 in a state where at least the positive electrode active material and the conductive material 1 are forcibly dispersed in the solvent to obtain composite particles containing the positive electrode active material and the conductive material 1. The present inventors consider the following: the conductive material 1 and the positive electrode active material which are used in the third embodiment are an aggregate of unit particles which are chemically stable in the solvent, and the conductive material 1 and the positive electrode active material are forcibly dispersed by ultrasonic waves or the like, preferably ultrasonic waves of a frequency of 15 to 25 kHz and an output of 100 to 500 W in the solvent to disperse the conductive material 1 and the positive electrode active material in a state close to the unit particles.

When the conductive material 1 and the positive electrode active material or the like are forcibly dispersed, the conductive material 1 and the positive electrode active material may be added into the solvent to be forcibly dispersed simultaneously. One of the conductive material 1 and positive electrode active material may be added into the solvent to be forcibly dispersed, and the other may be then added thereto to further be forcibly dispersed. Alternatively, a grinding step such as wet grinding may be carried out separately or simultaneously with the forcible dispersion in order to obtain the slurry in which the conductive material 1 is forcibly dispersed.

As the conductive material 1, a carbonaceous material is preferable. Examples thereof include fibrous carbon such as carbon black, carbon fiber and a carbon nanotube. Of these, the carbon black is preferable from the viewpoint of adherability, contactness or conductivity or the like to the positive electrode active material after being forcibly dispersed.

As the carbon black used as the conductive material 1, one produced by all of decomposing methods such as a thermal black method and an acetylene black method, and incomplete combustion methods such as a channel black method, a gas furnace black method, an oil furnace black method, a turpentine soot method, and a lamp black method can be used. However, the furnace black and the acetylene black are preferably used from the viewpoint of the conductivity. These may be used either alone or in combination of a plurality of kinds thereof.

The primary particle diameter of the conductive material 1 is preferably smaller than the primary particle diameter of the positive electrode active material in order to effectively stick the conductive material 1 to the surface of the positive electrode active material. The primary particle diameter of the conductive material 1 is preferably $1/5$ or less of that of the positive electrode active material, more preferably $1/10$ or less, and still more preferably $1/15$ or less. When the carbon black is particularly used, the primary particle diameter of the carbon black is preferably $1/5$ or less of the primary particle diameter of the positive electrode active material, more preferably 1/10 or less, and still more preferably 1/15 or less.

Alternatively, the primary particle diameter of the conductive material 1, preferably that of the carbon black is preferably 10 to 100 nm from the viewpoint of the easiness of the forcible dispersion and the adherability to the positive electrode active material, more preferably 15 to 80 nm, and still more preferably 20 to 50 nm. The carbon black having the primary particle diameter can be atomized to be surely stuck to the surface of the positive electrode active material and to further reduce the volume resistivity.

On the other hand, as the fibrous carbon, there is suitably used carbon fiber obtained from a polymer typified by polyacrylonitrile (PAN) as a raw material, pitch-based carbon fiber obtained from pitch as a raw material, vapor phase epitaxy-based carbon fiber (for example, VGCF) that is a carbon nanotube and that is obtained from hydrocarbon gas as a raw material, and so-called a narrowly-defined carbon nanotube (hereinafter, the narrowly-defined carbon nanotub is merely referred to as carbon nanotube) obtained by an arc discharge method, a laser evaporating method and a chemistry vapor growth method or the like. The fibrous carbon having a thin fiber diameter is preferable from the viewpoint of constructing more conductive paths. The VGCF and the carbon nanotube are suitably used, and the carbon nanotube is particularly preferably used.

The content of the conductive material 1 is preferably 0.2 to 8 parts by weight relative to 100 parts by weight of the positive electrode active material from the following viewpoint. That is, the content is preferably 0.2 part by weight or more relative to 100 parts by weight of the positive electrode active material from the viewpoint of reducing the volume resistance of the positive electrode material, more preferably 0.5 part by weight or more, and still more preferably 1 part by weight or more. Alternatively, the content is preferably 8 parts by weight or less from the viewpoint of the covering property to the surface of the positive electrode active material, more preferably 5 parts by weight or less, and still more preferably 3 parts by weight or less.

As the positive electrode active material in the third embodiment, any conventionally known materials can be also used. Examples thereof include Li—Mn-based composite oxides such as $LiMn_2O_4$, Li—Co-based composite oxides such as $LiCoO_2$, Li—Ni-based composite oxides such as $LiNiO_2$, Li—Fe-based composite oxides such as $LiFeO_2$, and the like. The other examples include $Li_xCoO_2$, $Li_xNiO_2$, $MnO_2$, $LiMnO_2$, $Li_xMn_2O_4$, $Li_xMn_{2-y}O_4$, $\alpha\text{-}V_2O_5$, and $TiS_2$. Of these, $LiMn_2O_4$, $LiCoO_2$ and $LiNiO_2$ are preferable from the viewpoint of excellent thermal stability, capacity and output characteristics, and $LiMn_2O_4$ is more preferable.

The primary particle diameter of the positive electrode active material is preferably 0.5 to 10 μm from the viewpoint of the safety, stability, cycle characteristics, reactivity and high-rate discharge characteristics of the positive electrode active material, more preferably 0.6 to 5 μm, and still more preferably 0.7 to 2 μm.

As the solvent used for dispersing, various solvents can be used. However, the boiling point of the solvent is preferably 100° C. or less from the viewpoint of the easiness of drying, more preferably 90° C. or less, and still more preferably 80° C. or less. As specific examples of the solvents, water, ethanol, acetone, methyl ethyl ketone, toluene and tetrahydrofuran or the like are exemplified. Of these, ethanol and methyl ethyl ketone are preferable from the viewpoint of the easiness of drying and the handling ability.

The amount of the solvent used is preferably 50 to 1000 parts by weight relative to 100 parts by weight of the positive electrode active material from the following viewpoint. That is, the amount is preferably 50 parts by weight or more relative to 100 parts by weight of the positive electrode active material from the viewpoint of effectively dispersing the conductive material 1 and the positive electrode active material or the like, and more preferably 100 parts by weight or more. Alternatively, the amount is preferably 1000 parts by weight or less from the viewpoint of the complication for drying the solvent or the like, and more preferably 800 parts by weight or less.

As the method for forcibly dispersing the conductive material 1 and the positive electrode active material, there are used a method for forcibly dispersing the conductive material 1 and the positive electrode active material in the solvent using a disperser, a method for dispersing the conductive material 1 and the positive electrode active material using a dispersing agent, and a method for make combination use of both the methods, or the like. Particularly, a disperser causing grinding operation (primary particle conversion in the case of carbon black) is preferably used in order to effectively obtain a slurry in which the conductive material 1 is forcibly dispersed.

Alternatively, the positive electrode active material is preferably dispersed in a primary particle state in a forcibly dispersed state, and the conductive material 1 is also preferably dispersed in a primary particle state or in a state close to a primary particle. Such a dispersion state can be confirmed by counting the number of the primary particles of the conductive material stuck to the surface of the positive electrode active material (for example, ten or more primary particles are observed at average value relative to one particle of the positive electrode active material) when the obtained composite material for positive electrodes is observed, for example, using the scanning electron microscope (SEM).

Examples of the dispersers include an ultrasonic type disperser, a stirring type disperser, a high speed rotating shear type disperser, a mill type disperser and a high-pressure injection type disperser. When the disperser is used in the step forcibly dispersing, the ultrasonic type disperser and the high-pressure injection type disperser are suitably used. Alternatively, as the disperser causing grinding operation, the mill type disperser is suitably used. The conductive material 1 may be previously prepared by wet grinding or dry grinding, and the conductive material 1 may be dispersed in the solvent.

The method using the dispersing agent is particularly effective for suitably dispersing the conductive material 1. When the dispersing agent is used, an anionic, nonionic or cationic surface-active agent, or a polymer dispersing agent can be used as the dispersing agent. However, the polymer dispersing agent is preferably used in view of the dispersion performance.

Various compounds can be used as the polymer dispersing agent. However, a polycarboxylic acid-based polymer dispersing agent having a plurality of carboxyl groups in a molecule, a polyamine-based polymer dispersing agent having a plurality of amino groups in a molecule, a polymer dispersing agent having a plurality of amide groups in a molecule, and a polymer dispersing agent containing a plurality of polycyclic aromatic compounds in a molecule are preferable.

Examples of the polyamine-based polymer dispersing agents include a comb polymer prepared by grafting polyester to polyamine such as polyalkylene amine, polyallylamine, and N,N-dimethylaminoethyl metacrylate.

Examples of the polycarboxylic acid-based polymer dispersing agents include a copolymer of (meth) acrylic acid and (meth) acrylic acid ester, an amide compound and ester compound of an anhydrous maleic acid copolymer and various amines such as alkylamine or alcohol, and a comb polymer prepared by grafting a polyester of a polycarboxylic acid such as a poly(meth) acrylic acid copolymer and a polyalkylene glycol. In this specification, the (meth) acrylic acid means an acrylic acid or a methacrylic acid.

Examples of the polymer dispersing agents having a plurality of amide groups in a molecule include a copolymer of polyamide, polyvinylpyrrolidone and poly N,N-dimethylacrylamide obtained by a condensation reaction, and a comb polymer prepared by grafting polyester or polyalkylene glycol thereto.

Examples of the polymer dispersing agents containing the polycyclic aromatic compound include a copolymer of a vinyl monomer having pyrene and a quinacridone skeleton and various monomers. The above dispersing agents may be used either alone or in combination of a plurality of kinds thereof.

When the dispersing agent is used, the additive amount of the dispersing agent is preferably 0.1 to 20 parts by weight relative to 100 parts by weight of objects to be dispersed (the positive electrode active material+the conductive material 1 in the present invention) from the viewpoint of suitable dispersion, and more preferably 0.5 to 10 parts by weight.

The composite particle-forming step in the third embodiment removes the solvent from the slurry obtained by the above dispersion to obtain the composite particles. The solvent can be removed from the slurry by heating evaporation, decompression distillation, spray dry and freeze-drying or the like.

The composite particles thus obtained have a structure where the conductive material 1 is stuck to the positive electrode active material. However, the covering rate of the conductive material 1 to the surface of the positive electrode active material can be easily controlled by the content ratio and size rate of particles or the like of the conductive material 1 and positive electrode active material. This covering rate is preferably 5% or more from the viewpoint of reducing the volume resistivity, and more preferably 10% or more. The covering rate is preferably 80% or less from the viewpoint of suitably securing the diffusion path of lithium ions, and more preferably 70% or less.

Furthermore, the third embodiment includes at least the mixing step of mixing the above composite particles and the conductive material 2 having an aspect ratio of 2 to 10. This step produces the fine composite structure where the conductive material 2 having an aspect ratio 2 to 10 is interposed between the composite particles in which the conductive material 1 is stuck to the positive electrode active material. Therefore, a mixing method capable of maintaining the structure of the composite particles as possible is preferably adopted in this mixing step.

As the mixing method, any methods of wet-mixing and dry-mixing are possible. However, the wet-mixing is preferable from the viewpoint of uniform mixing. As the dry-mixing, powder mixers such as a V type mixer and a ribbon type mixer, and mixers such as kneader and Henschel mixer can be used. Alternatively, as the wet-mixing, stirring type mixers having a structure where materials are mixed by a butterfly type, anchor type, ribbon type and frame type stirring plates, and mixing devices such as a high speed disperser and a homomixer can be used.

As the conductive material 2 having an aspect ratio of 2 to 10, the carbon black having a structure constitution is preferable. The present inventors consider that voids for diffusing Li ions can be suitably formed by the development of the structure constitution in the carbon black having the aspect ratio of such a range, and the carbon black can be interposed between the composite particles to suitably form the conductive path.

The following can be used as the carbon black. The carbon black may have an agglutination structure where primary particles tied in queue are branched in an irregular chain-like form. When such particles are observed by the scanning electron microscope, the aspect ratio of the diameter of the longest diameter (L) and shortest diameter (W), i.e., L/W becomes important.

The aspect ratio of the conductive material 2 is 2 or more from the viewpoint of the conductivity of the composite material for positive electrodes, preferably 3 or more, and more preferably 3.5 or more. The aspect ratio is 10 or less from the viewpoint of securing the diffusion path of lithium ions, and preferably 5 or less.

The carbon black having a high aspect ratio, which has an agglutination structure, generally has a large DBP absorption amount. Therefore, the DBP absorption amount of the carbon black having the structure constitution is preferably 100 $cm^3$/100 g or more, more preferably 120 $cm^3$/100 g or more, and still more preferably 150 $cm^3$/100 g or more. Alternatively, the DBP absorption amount is preferably 500 $cm^3$/100 g or less from the viewpoint of suppressing the reduction in electrode density, more preferably 400 $cm^3$/100 g or less, still more preferably 300 $cm^3$/100 g or less, and yet still more preferably 200 $cm^3$/100 g or less. Piecing together the above viewpoints, the DBP absorption amount is preferably 100 to 500 $cm^3$/100 g, more preferably 100 to 400 $cm^3$/100 g, still more preferably 120 to 300 $cm^3$/100 g, and yet still more preferably 150 to 200 $cm^3$/100 g.

Alternatively, the specific surface area of the carbon black is preferably 20 $m^3$/g or more, more preferably 30 $m^3$/g or more, and still more preferably 40 $m^3$/g. The specific surface area is preferably 2000 $m^3$/g or less from the viewpoint of moderately suppressing the capacity of the positive electrode to secure the compactness, more preferably 500 $m^3$/g or less, and still more preferably 100 $m^3$/g or less. Piecing together the above viewpoints, the specific surface area is preferably 20 to 2000 $m^3$/g, more preferably 30 to 500 $m^3$/g, and still more preferably 40 to 100 $m^3$/g.

As the carbon black having the above structure constitution, carbon black or the like which is used as the conductive material 1 and is not microfine particled can be used. More specific examples thereof include conductive carbon black produced by a Furness method for thermally decomposing carbon hydride as a raw material using the combustion heat of crude oil or gas to produce carbon black, ketjen black obtained by a gasification process of heavy oil, and acetylene black obtained by thermally decomposing acetylene gas. For example, ketjen black EC manufactured by Lion Corporation, Balkan XC-72 manufactured by Cabot Corporation, and Printex L6 and Printex XE2 manufactured by Degussa Corporation, or the like are available commercially.

The particle diameter of the carbon black having the structure constitution, which is represented by the average particle diameter (agglutination particle diameter) of the agglomerate constituted by connecting the primary particles, and is determined by measuring the particle size distribution using a laser diffraction/dispersion type particle distribution measurement device LA750 (manufactured by Horiba, Ltd.). This average particle diameter is preferably 0.05 to 10 μm from the viewpoints of the conductivity of the positive electrode and the smoothness of a coating film when coating the positive electrode material to form the coating film, more preferably 0.08 to 5 μm, and still more preferably 0.1 to 2 μm.

The compounding amount of the conductive material 2 is preferably 2 parts by weight or more relative to 100 parts by weight of the positive electrode active material from the viewpoint of reducing the volume resistivity caused by forming the conductive path of the positive electrode obtained, more preferably 4 parts by weight or more, and still more preferably 8 parts by weight or more. Alternatively, the compounding amount is preferably 50 parts by weight or less from the viewpoint of enhancing the energy density of the composite material for positive electrodes, more preferably 30 parts by weight or less, and still more preferably 15 parts by weight or less.

The total compounding amount of the conductive material 1 and conductive material 2 is preferably 3 to 50 parts by weight relative to 100 parts by weight of the positive electrode active material from the following viewpoint. That is, the total compounding amount is preferably 3 parts by weight or more relative to 100 parts by weight of the positive electrode active material from the viewpoint of reducing the volume resistance of the composite positive electrode material, more preferably 5 parts by weight or more, and still more preferably 10 parts by weight or more. Alternatively, the total compounding amount is preferably 50 parts by weight or less from the viewpoint of enhancing the energy density of the composite positive electrode material, more preferably 30 parts by weight or less, and still more preferably 15 parts by weight or less.

The volume resistivity of the obtained composite material for positive electrodes is preferably 5 Ω·cm or less from the viewpoint of enhancing the high-rate discharge characteristics, more preferably 3 Ω·cm or less, and still more preferably 2 Ω·cm or less.

Alternatively, the fourth embodiment includes the composite particle-forming step of removing the solvent from the slurry obtained by dispersing the positive electrode active material and the conductive material 1 in the state where at least the positive electrode active material and the conductive material 1 are forcibly dispersed in the solvent to obtain the composite particles containing the positive electrode active material and the conductive material 1, and the mixing step of mixing at least the composite particles and the conductive material 2 having a DBP absorption amount of 100 to 500 cm$^3$/100 g. This fourth embodiment also exhibits the same effects as those of the third embodiment described above. The DBP absorption amount is measured by a method described in Example. Alternatively, the preferred examples of the constituent features in the above fourth embodiment are the same as those of the third embodiment described above.

The composite material for positive electrodes produced in the present invention can be obtained as a slurry or a powder, and positive electrodes of lithium ion secondary batteries or the like can be formed using the composite material for positive electrodes. The positive electrode is generally formed by applying a slurry prepared by mixing a positive electrode active material, a conductive material, a binder and a solvent onto a metallic foil used as a current collector, and drying the slurry. Therefore, the composite material for positive electrodes produced in the present invention can be used for forming the positive electrode when the binder can be added into the composite material in the slurry state if needed. Alternatively, a powdered composite material for positive electrodes can be used for forming the positive electrode when the binder and the solvent are added into the composite material if needed.

Any of conventional binders used for forming the positive electrode can be used as the binder. Polyvinylidene difluoride, polyamideimide, polytetrafluoroethylene, polyethylene, polypropylene and polymethylmethacrylate or the like can be suitably used.

As the solvent, any of conventional solvents used for forming the positive electrode can be used. For example, N-methyl-2-pyrolidone (NMP), dimethylformamide (DMF), dimethylacetamide, methyl ethyl ketone, tetrahydrofuran, acetone, ethanol and ethyl acetate or the like are suitably used. As the current collector, any of conventional metallic foils used for forming the positive electrode can be used. Alternatively, any of conventionally known additive agents used for forming the positive electrode can be added into the slurry.

The composite material for positive electrodes produced in the present invention provides excellent high-rate discharge characteristics of Li ion secondary batteries when the composite material is used as the positive electrode material. Referring to the high-rate discharge characteristics, the rate of discharge amount of 60 C relative to 1 C in evaluations of battery characteristics to be described later is preferably 55% or more, and more preferably 60% or more.

The present invention can also provide a method for producing a positive electrode for lithium batteries including the step of: obtaining a composite material for positive electrodes by the method for producing the composite material for positive electrodes of lithium batteries of the present invention; and applying a slurry containing the composite material for positive electrodes, a solvent and a binder onto a current collector and drying the slurry.

The use application of the battery using the composite material for positive electrodes produced in the present invention is not particularly limited. For example, the battery can be used for electronic equipments such as a notebook computer, an electronic book player, a DVD player, a portable audio player, a video movie, a portable television and a cellular phone. Furthermore, the battery can be used for consumer appliances such as batteries for a cordless cleaner, a cordless power tool, an electromobile and a hybrid vehicle, and an auxiliary power source for a fuel-cell vehicle. Of these, the battery is suitably used as a battery for automobiles particularly requiring high output.

Hereinafter, Examples or the like specifically showing the present invention will be described. Evaluation items in Examples or the like were measured as follows.

(1) DBP Absorption Amount

The DBP absorption amount was measured based on JISK 6217-4.

(2) Average Particle Diameter of Conductive Material and Primary Particle Diameter of Positive Electrode Active Material The laser diffraction/dispersion type particle distribution measurement device LA750 (manufactured by Horiba, Ltd.) was used, and ethanol was used as a dispersion medium. When the particle size distribution after applying ultrasonic waves for 1 minute was measured at a relative refractive index of 1.5 in the conductive material and at a relative refractive index of 1.7 in the positive electrode active material, the values of volume middle particle diameters (D50) were defined as the average particle diameter of the conductive material and the primary particle diameter of the positive electrode active material.

(3) Primary Particle Diameter of Carbon Black

Fifty primary particles were extracted from a SEM image photographed by a field emission type scanning electron microscope (S-4000 manufactured by Hitachi, Ltd.), and the average value obtained by measuring the diameters of the primary particles was defined as the primary particle diameter.

(4) Fiber Diameter and Fiber Length of Fibrous Carbon

Thirty fibers were extracted from the SEM image photographed by the field emission type scanning electron microscope (S-4000 manufactured by Hitachi, Ltd.). The average value obtained by measuring the fiber diameters of the fibers was defined as the fiber diameter. Alternatively, the result obtained by measuring and averaging the lengths of the fibers was defined as the fiber length.

(5) Aspect Ratio of Fibrous Carbon

The aspect ratio of the fibrous carbon was determined by dividing the fiber length of the fibrous carbon by the fiber diameter.

(6) Volume Resistivity

In a method of JIS K 1469, the values of a powder sample amount and a pressure in powder compression were respectively changed to 0.3 g and 100 kg/cm$^2$, and the electric resistance values of cylindrically compressed powder samples were measured. The volume resistivity (electric resistivity) was calculated by the following formula 1 from the measured resistance values.

Specifically, a cylindrical container which includes an insulative cylinder (made of bakelite, outer diameter: 28 mm, inner diameter: 8 mm) and a (minus) electrode was filled with 0.3 g of a powder sample. A (plus) electrode was inserted into the insulative cylindrical container filled with the sample to sandwich the powder sample between the (minus) electrode and the (plus) electrode. The cylindrical container was provided on a pressing machine mount. A force of 100 kg/cm$^2$ was applied to the sample in the cylindrical container by a pressing machine to compress the sample. The (plus) electrode and the (minus) electrode were connected to input measuring cables of a digital multi-meter. The electric resistance value was measured after an elapse of three minutes since the initiation of compression.

$$\rho = S/h \times R \quad \text{(formula 1)}$$

Wherein $\rho$ is an electric resistivity ($\Omega \cdot cm$); S is a cross section area (cm$^2$) of a sample; and h is a filling height (cm) of the sample; and R is an electric resistance value ($\Omega$).

The used (minus) electrode, which was made of brass, had an electrode surface having a diameter of 7.8±1 mm, and was a pedestal-shaped electrode having a projection part having a height of 5 mm. The (plus) electrode, which was made of brass, had an electrode surface having a diameter of 7.8±1 mm, and was a rod-shaped electrode having a length of 60 mm.

(7) Preparation of Batteries

For 20.8 parts by weight of a powder sample, 1.7 parts by weight of a commercially available conductive carbon black powder (trade name: HS-100, DBP absorption amount: 140 cm$^3$/100 g), 2.5 parts by weight of a polyvinylidene difluoride powder (#1300 manufactured by Kureha Corporation), and 37.5 parts by weight of NMP were uniformly mixed to prepare a coating paste. The paste was uniformly coated on an aluminum foil (thickness: 20 μm) used as a current collector using a coater, and was dried at 140° C. for 10 minutes or more. After drying, the dried paste was molded to a uniform film thickness by the pressing machine, and was then cut in a predetermined size (20 mm×15 mm) to produce a test positive electrode. At this time, the thickness of an electrode active material layer was 25 μm.

A test cell was produced using the above test positive electrode. A metal lithium foil cut to a predetermined size was used for a negative electrode, and Cell Guard #2400 (manufactured by Cell Guard Corporation) was used as a separator. 1 mol/l of LiPF$_6$/ethylene carbonate (EC):diethyl carbonate (DEC) (EC:DEC=1:1 vol %) was used as an electrolysis solution. The test cell was assembled in a glove box under an argon atmosphere. The high-rate discharge characteristics of the test cell were evaluated after leaving the test cell at 25° C. for 24 hours after assembling the test cell.

(8) Evaluation of High-Rate Discharge Characteristics

The test cell was charged and discharged with a constant current in 0.2 C. Then (1) a discharge capacity (A) of the test cell was measured after charging the test cell with a constant current in 0.5 C and discharging after the test cell with a constant current in 1 C and (2) a discharge capacity (B) of the test cell was measured after charging the test cell with a constant current in 0.5 C and discharging after the test cell with a constant current in 60 C. A ratio of A and B was defined as high-rate discharge characteristics.

High-rate discharge characteristics(%)=B/A×100

(9) Total Pore Volume

A pore volume of 0.008 μm to 200 μm was measured using a mercury injection pore size distribution measurement device (Poresizer 9320 manufactured by Shimadzu Corporation), and the obtained value was defined as the total pore volume.

(10) Autoagglutination Test 2 g of a conductive material is added into 500 g of ethanol, and ultrasonic waves are applied for 1 minute in a frequency of 19 kHz and an output of 300 W using an ultrasonic homogenizer (MODEL US-300T manufactured by NISSEI Corporation). The application of the ultrasonic waves is then stopped. About 1 cc of a sampling liquid is sampled immediately after stopping the application, and the average particle diameter (A) of the sampling liquid is promptly measured in a relative refractive index 1.5 without applying ultrasonic waves using ethanol as the dispersion medium in the laser diffraction/dispersion type particle distribution measurement device LA750 (manufactured by Horiba, Ltd.). Next, the dispersion liquid of the conductive material is sampled after an elapse of 3 minutes since the application of the ultrasonic waves is stopped, and the average particle diameter (B) thereof is measured by the above LA750 on the same measurement conditions as those of the average particle diameter (A). The sampling liquid having a value of 2 or more was defined as a conductive material having autoagglutination, the value obtained by dividing the average particle diameter (B) by the average particle diameter (A).

Table 1 shows the evaluation results in that case.

TABLE 1

| | | average particle diameter (μm) | | |
|---|---|---|---|---|
| | | (A) immediately after stopping ultrasonic waves | (B) after being quietly placed for 3 minutes after stopping ultrasonic waves | particle diameter ratio B/A |
| autoagglutination | CNT | 32 | 96 | 3.0 |
| | ketjen black | 11 | 38 | 3.5 |
| | VGCF | 4.4 | 47 | 10.7 |
| non-autoagglutination | carbon black (#5500) | 5 | 9.5 | 1.9 |

TABLE 1-continued

| | average particle diameter (μm) | | |
|---|---|---|---|
| | (A) immediately after stopping ultrasonic waves | (B) after being quietly placed for 3 minutes after stopping ultrasonic waves | particle diameter ratio B/A |
| carbon black (HS-100) | 3 | 5 | 1.7 |

EXAMPLE 1

2 parts by weight of a carbon nanotube having a fiber diameter of 20 nm, a fiber length of 10 μm and an aspect ratio of 500 as a conductive material was added into 500 parts by weight of ethanol as a solvent. The carbon nanotube was ultrasonically dispersed (applying time: 3 minutes) using an ultrasonic type disperser. Next, 2 parts by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were ultrasonically dispersed (applying time: 1 minute). While ultrasonic waves were applied to this carbon dispersion liquid, 100 parts by weight of lithium manganate ground as a positive electrode active material and having a primary particle diameter of 0.4 μm was added thereto, and they were further dispersed (applying time: 2 minutes) by ultrasonic waves to be in a forcibly dispersed state. The application of the ultrasonic waves was then stopped to produce autoagglutination, and ethanol was then distilled to obtain a composite material for positive electrodes. Table 2 shows the physical properties of the obtained composite material for positive electrodes.

In the above, 2 cc of a slurry was sampled within 10 seconds after stopping the application of the ultrasonic waves. Ethanol was added thereto to dilute the slurry until the transmissivity of the slurry was 95%. The average particle diameter is promptly measured by a laser diffraction/dispersion type particle distribution measurement device LA750 (manufactured by Horiba, Ltd.). A state where the average particle diameter is within 130% of the primary particle diameter of the positive electrode active material is regarded as a "forcibly dispersed state" (the following Examples are also the same).

EXAMPLE 2

2 parts by weight of a carbon nanotube having a fiber diameter of 20 nm, a fiber length of 10 μm and an aspect ratio of 500 was added into 500 parts by weight of ethanol, and the carbon nanotube was ultrasonically dispersed (applying time: 3 minutes) using an ultrasonic type disperser. Next, 2 parts by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were ultrasonically dispersed (applying time: 1 minute). While ultrasonic waves were applied to this carbon dispersion liquid, 100 parts by weight of lithium manganate having a primary particle diameter of 0.8 μm was added thereto, and they were further dispersed (applying time: 2 minutes) by ultrasonic waves to be in a forcibly dispersed state. The application of the ultrasonic waves was then stopped to produce autoagglutination, and ethanol was then distilled to obtain a composite material for positive electrodes. Table 2 shows the physical properties of the obtained composite material for positive electrodes.

EXAMPLE 3

2 parts by weight of a carbon nanotube having a fiber diameter of 20 nm, a fiber length of 10 μm and an aspect ratio of 500 was added into 500 parts by weight of NMP, and the carbon nanotube was ultrasonically dispersed (applying time: 3 minutes) using an ultrasonic type disperser. Next, 2 parts by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were ultrasonically dispersed (applying time: 1 minute). While ultrasonic waves were applied to this carbon dispersion liquid, 100 parts by weight of lithium manganate having a primary particle diameter of 0.8 μm was added thereto, and they were further dispersed (applying time: 2 minutes) by ultrasonic waves to be in a forcibly dispersed state. The application of the ultrasonic waves was then stopped to autoagglutinate the carbon nanotube in the NMP to obtain a dispersion liquid containing a composite material for positive electrodes. Although this dispersion liquid into which necessary components were added could be used for forming the positive electrodes in a liquid state, a solvent was distilled for evaluating the physical properties to obtain a composite material for positive electrodes. Table 2 shows the physical properties of the obtained composite material for positive electrodes.

EXAMPLE 4

2 parts by weight of ketjen black having an average particle diameter of 10 μm (primary particle diameter: 35 nm) and a DBP absorption amount of 495 cm$^3$/100 g was added into 500 parts by weight of NMP, and the ketjen black was ultrasonically dispersed (applying time: 3 minutes) using an ultrasonic type disperser. Next, 2 parts by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were ultrasonically dispersed (applying time: 1 minute). While ultrasonic waves were applied to this carbon dispersion liquid, 100 parts by weight of lithium manganate having a primary particle diameter of 0.8 μm was added thereto, and they were further dispersed (applying time: 2 minutes) by ultrasonic waves to be in a forcibly dispersed state. The application of the ultrasonic waves was then stopped to autoagglutinate the ketjen black in the NMP to obtain a dispersion liquid containing a composite material for positive electrodes. Although this dispersion liquid into which necessary components were added could be used for forming the positive electrode in a liquid state, a solvent was distilled for evaluating the physical properties to obtain a composite material for positive electrodes. Table 2 shows the physical properties of the obtained composite material for positive electrodes.

EXAMPLE 5

2 parts by weight of VGCF having a fiber diameter of 120 nm, a fiber length of 10 μm and an aspect ratio of 83 was added into 500 parts by weight of NMP, and the VGCF was ultrasonically dispersed (applying time: 3 minutes) using an ultrasonic type disperser. Next, 2 parts by weight of carbon black (#5500 manufactured by Tokai Carbon Co., Ltd.) having an average particle diameter of 2 μm (primary particle diameter: 25 nm) and a DBP absorption amount of 155 cm$^3$/100 g was added thereto, and they were ultrasonically dispersed (applying time: 1 minute). While ultrasonic waves were applied to this carbon dispersion liquid, 100 parts by weight of lithium manganate having a primary particle diameter of 0.8 μm was added thereto, and they were further dispersed (applying time: 2 minutes) by ultrasonic waves to be in a forcibly dispersed state. The application of the ultrasonic waves was then stopped to autoagglutinate the VGCF in the NMP to obtain a dispersion liquid containing a composite material for positive electrodes. Although this dispersion liquid into which necessary components were added could be used for forming the positive electrode in a liquid state, a solvent was distilled for evaluating the physical properties to obtain a composite material for positive electrodes. Table 2 shows the physical properties of the obtained composite material for positive electrodes.

EXAMPLE 6

A dispersion liquid containing a composite material for positive electrodes was obtained on the same conditions as those of Example 4 except that the additive amount of the ketjen black was 4 parts by weight and additional carbon black was not added in Example 4, and a solvent was then distilled for evaluating the physical properties to obtain a composite material for positive electrodes. Table 2 shows the physical properties of the obtained composite material for positive electrodes.

EXAMPLE 7

A dispersion liquid containing a composite material for positive electrodes was obtained on the same conditions as those of Example 4 except that lithium manganate added to the carbon dispersion liquid and having a primary particle diameter of 0.5 μm was used in Example 4, and a solvent was then distilled for evaluating the physical properties to obtain a composite material for positive electrodes. Table 2 shows the physical properties of the obtained composite material for positive electrodes.

EXAMPLE 8

A dispersion liquid containing a composite material for positive electrodes was obtained on the same conditions as those of Example 4 except that lithium manganate added to the carbon dispersion liquid and having a primary particle diameter of 1.2 μm was used in Example 4, and a solvent was then distilled for evaluating the physical properties to obtain a composite material for positive electrodes. Tablet shows the physical properties of the obtained composite material for positive electrodes.

EXAMPLE 9

A dispersion liquid containing a composite material for positive electrodes was obtained on the same conditions as those of Example 8 except that FX-35 (carbon black manufactured by Denki Kagaku Kogyo Kabushiki Kaisha) was used in place of the ketjen black in Example 8, and a solvent was then distilled for evaluating the physical properties to obtain a composite material for positive electrodes. Table 2 shows the physical properties of the obtained composite material for positive electrodes.

EXAMPLE 10

A dispersion liquid containing a composite material for positive electrodes was obtained on the same conditions as those of Example 8 except that #3050B (carbon black manufactured by Tokai Carbon Co., Ltd.) was used in place of the ketjen black in Example 8, and a solvent was then distilled for evaluating the physical properties to obtain a composite material for positive electrodes. Table 2 shows the physical properties of the obtained composite material for positive electrodes.

EXAMPLE 11

A dispersion liquid containing a composite material for positive electrodes was obtained on the same conditions as those of Example 4 except that lithium manganate added to the carbon dispersion liquid and having a primary particle diameter of 10 μm was used in Example 4, and a solvent was then distilled for evaluating the physical properties to obtain a composite material for positive electrodes. Table 2 shows the physical properties of the obtained composite material for positive electrodes.

COMPARATIVE EXAMPLE 1

4 parts by weight of carbon black (HS-100 manufactured by Denki Kagaku Kogyo Kabushiki Kaisha) having an average particle diameter of 1 μm (primary particle diameter: 50 nm) and a DBP absorption amount of 140 cm$^3$/100 g was dry-mixed with 100 parts by weight of lithium manganate having a primary particle diameter of 0.8 μm to obtain a comparative positive electrode material. Table 2 shows the physical properties of the obtained material.

COMPARATIVE EXAMPLE 2

2 parts by weight of carbon black (#5500 manufactured by Tokai Carbon Co., Ltd.) having an average particle diameter of 2 μm (primary particle diameter: 50 nm) and a DBP absorption amount of 155 cm$^3$/100 g, and 2 parts by weight of ketjen black having an average particle diameter of 10 μm (primary particle diameter: 35 nm) and a DBP absorption amount of 495 were dry-mixed with 100 parts by weight of lithium manganate having a primary particle diameter of 0.8 μm to obtain a comparative positive electrode material. Table 2 shows the physical properties of the obtained material.

COMPARATIVE EXAMPLE 3

2 parts by weight of carbon black (#5500 manufactured by Tokai Carbon Co., Ltd.) having an average particle diameter of 2 μm (primary particle diameter: 25 nm) and a DBP absorption amount of 155 cm$^3$/100 g, and 2 parts by weight of a carbon nanotube having a fiber diameter of 20 nm, a fiber length of 10 μm and an aspect ratio of 500 were dry-mixed with 100 parts by weight of lithium manganate having a primary particle diameter of 0.8 μm to obtain a comparative positive electrode material. Table 2 shows the physical properties of the obtained material.

TABLE 2

| | positive electrode active material | | conductive material | | | | | | values of physical properties | | | |
|---|---|---|---|---|---|---|---|---|---|---|---|---|
| | material | primary particle diameter (μm) | conductive material types | *1 | *2 | additional conductive material types | *2 | solvent | compounding process | average particle diameter of agglutination particles (μm) | volume resistivity (Ω·cm) | total pore volume (cc/g) | high-rate discharge characteristics (%) |
| Example 1 | LiMn$_2$O$_4$ | 0.4 | CNT | 500 | — | #5500 | 155 | EtOH | dispersion → agglutination → solvent removal | 10 | 1.6 | 1.2 | 90 |
| Example 2 | LiMn$_2$O$_4$ | 0.8 | CNT | 500 | — | #5500 | 155 | EtOH | dispersion → agglutination → solvent removal | 3.7 | 2 | 0.9 | 85 |
| Example 3 | LiMn$_2$O$_4$ | 0.8 | CNT | 500 | — | #5500 | 155 | NMP | dispersion → agglutination | 1.5 | 2 | 0.9 | 85 |
| Example 4 | LiMn$_2$O$_4$ | 0.8 | Ketjen black | — | 495 | #5500 | 155 | NMP | dispersion → agglutination | 2 | 1.8 | 1.1 | 88 |
| Example 5 | LiMn$_2$O$_4$ | 0.8 | VGCF | 83 | — | #5500 | 155 | NMP | dispersion → agglutination | 3 | 2.1 | 0.9 | 80 |
| Example 6 | LiMn$_2$O$_4$ | 0.8 | ketjen black | — | 495 | — | — | NMP | dispersion → agglutination | 3.5 | 1.9 | 1 | 86 |
| Example 7 | LiMn$_2$O$_4$ | 0.5 | ketjen black | — | 495 | #5500 | 155 | NMP | dispersion → agglutination | 2 | 1.9 | 1.1 | 65 |
| Example 8 | LiMn$_2$O$_4$ | 1.2 | ketjen black | — | 495 | #5500 | 155 | NMP | dispersion → agglutination | 5 | 1.5 | 1.1 | 90 |
| Example 9 | LiMn$_2$O$_4$ | 1.2 | FX-35 | — | 210 | #5500 | 155 | NMP | dispersion → agglutination | 5 | 1.5 | 1 | 80 |
| Example 10 | LiMn$_2$O$_4$ | 1.2 | #3050B | — | 175 | #5500 | 155 | NMP | dispersion → agglutination | 5 | 1.5 | 0.9 | 75 |
| Example 11 | LiMn$_2$O$_4$ | 10 | ketjen black | — | 495 | #5500 | 155 | NMP | dispersion → agglutination | 15 | 1.4 | 1.1 | 65 |
| Comp. Example 1 | LiMn$_2$O$_4$ | 0.8 | — | — | — | HS-100 | 140 | non-existence | powder mixing (no compounding treatment) | — | 6.7 | 0.6 | 50 |
| Comp. Example 2 | LiMn$_2$O$_4$ | 0.8 | ketjen black | — | 495 | #5500 | 155 | non-existence | powder mixing (no compounding treatment) | — | 3.7 | 0.7 | 65 |
| Comp. Example 3 | LiMn$_2$O$_4$ | 0.8 | CNT | 500 | — | #5500 | 155 | non-existence | powder mixing (no compounding treatment) | — | 4 | 0.7 | 60 |

*1: aspect ratio (—)
*2: DBP absorption amount (cm$^3$/100 g)

The result of Table 2 shows that the composite materials of Examples in which the conductive material having autoagglutination in the solvent wraps around the positive electrode active material have lower volume resistivity and higher pore volume than those of one obtained by dry-mixing the conductive material and the positive electrode active material, and have excellent high-rate discharge characteristics.

On the other hand, FIG. 1 shows a scanning electron micrograph of the composite material for positive electrodes obtained in Example 1. In this photograph, the composite material for positive electrodes obtained in the present invention has a fine composite structure where the agglutinated conductive material (the primary particles look small in the photograph) wraps around the positive electrode active material (the primary particles look large in the photograph). Alternatively, the present inventors consider that since the total pore volume of Example 1 is larger than that of Comparative Example, the composite material of Example 1 has a fine composite structure having moderate voids.

Next, Examples 12 to 20 and Comparative Examples 4 to 7 will be described. Evaluation items or the like other than (11) a surface covering rate of composite particles, (12) an aspect ratio of carbon black and (13) production of batteries which are shown below are the same as the above.

(11) Surface Covering Rate of Composite Particles

SEM-EDS analysis was conducted by the field emission type scanning electron microscope (S-4000 manufactured by Hitachi, Ltd.), and the surface covering rate of carbon was determined.

(12) Aspect Ratio of Carbon Black

Thirty carbon black secondary aggregates having a shape where primary particles tied in queue and having the longest diameter of average particle diameter±(average particle diameter×0.2) were extracted from a SEM image photographed by the field emission type scanning electron microscope (S-4000 manufactured by Hitachi, Ltd.). The ratio of the longest diameter (L) and shortest diameter (W), i.e., the average value of L/W was determined as an aspect ratio. The longest diameter means a length of the longest line segment of line segments of a straight line L cut out by the agglomerate image, the straight line L passing through (including contacting with) a secondary agglomerate area (hereinafter, referred to as agglomerate image) of the SEM image of the secondary agglomerate. Alternatively, the shortest diameter means a distance between most apart two parallel lines of straight line groups parallel to a straight line corresponding to the longest diameter in the straight line L. The distance between the two parallel lines means a length of a line segment of a straight line cut out by the two parallel lines, the straight line perpendicular to the two parallel lines.

(13) Production of Batteries 3 parts by weight of a polyvinylidene difluoride powder (#1300 manufactured by Kureha Corporation) and 45 parts by weight of NMP were uniformly mixed with 27 parts by weight of a powder sample to prepare a coating paste. The paste was uniformly coated on an aluminum foil (thickness: 20 μm) used as a current collector using a coater, and was dried at 140° C. for 10 minutes or more. After the paste was dried, the obtained film was molded to a uniform film thickness by a pressing machine, and the film was cut in a predetermined size (20 mm×15 mm) to produce a test positive electrode. The thickness of an electrode active material layer at this time was 25 μm.

EXAMPLE 12

0.4 part by weight of fine particle carbon black (#7550 manufactured by Tokai Carbon Co., Ltd.) having an average particle diameter of 0.6 μm (primary particle diameter: 21 nm) was added into 100 parts by weight of ethanol, and the carbon black was ultrasonically dispersed using an ultrasonic type disperser. 20 parts by weight of lithium manganate having a primary particle diameter of 0.8 μm was added into this dispersion liquid, and they were further dispersed by ultrasonic waves. The obtained slurry was evaporated to be dry-cured to obtain a powder (CB sticking lithium manganate, surface covering rate: 24%) obtained by sticking fine particle carbon black to the surface of the lithium manganate. 2.1 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 was then added into 100 parts by weight of ethanol, and they were stirred by T.K. homodisper. Next, 20.4 parts by weight of the CB sticking lithium manganate was added thereto, and they were mixed by the T.K. homodisper. The obtained slurry was evaporated to be dry-cured to obtain a composite material for positive electrodes. Table 3 shows the physical properties of the obtained composite material for positive electrodes.

EXAMPLE 13

0.56 part by weight of a polyacrylic acid-based dispersing agent (isobutylene-stearylamide maleate) was added into 100 parts by weight of 2-butanone. 11.1 parts by weight of carbon black (HS-100 manufactured by Denki Kagaku Kogyo Kabushiki Kaisha, DBP absorption amount: 140 cm$^3$/100 g) having an average particle diameter of 1 μm (primary particle diameter: 45 nm) and an aspect ratio of 3.8 was added thereto to obtain a slurry. This slurry was wet-ground using Dyno-Mill to obtain a fine particle carbon black slurry having an average particle diameter of 0.3 μm (primary particle diameter: 45 nm). Next, 4 parts by weight of the obtained fine particle carbon black slurry was added into 100 parts by weight of 2-butanone, and they were ultrasonically dispersed using an ultrasonic type disperser. 20 parts by weight of lithium manganate having a primary particle diameter of 0.8 μm was added into this dispersion liquid, and they were further ultrasonically dispersed. The obtained slurry was evaporated to be dry-cured to obtain a powder (CB sticking lithium manganate, surface covering rate: 32%) obtained by sticking fine particle carbon black to the surface of the lithium manganate. 2.1 parts by weight of carbon black (HS-100 manufactured by Denki Kagaku Kogyo Kabushiki Kaisha) having an average particle diameter of 1 μm and an aspect ratio of 3.8 was then added into 100 parts by weight of ethanol, and they were stirred by T.K. homodisper. Next, 20.4 parts by weight of the CB sticking lithium manganate was added thereto, and they were mixed by the T.K. homodisper. The obtained slurry was evaporated to be dry-cured to obtain a composite material for positive electrodes. Table 3 shows the physical properties of the obtained composite material for positive electrodes.

EXAMPLE 14

0.4 part by weight of fine particle carbon black (#5500 manufactured by Tokai Carbon Co., Ltd.) having an average particle diameter of 0.8 μm (primary particle diameter: 25 nm) was added into 100 parts by weight of ethanol, and the carbon black was ultrasonically dispersed using an ultrasonic type disperser. 20 parts by weight of lithium manganate having a primary particle diameter of 0.8 μm was added into this dispersion liquid, and they were further dispersed by ultrasonic waves. The obtained slurry was evaporated to be dry-cured to obtain a powder (CB sticking lithium manganate, surface covering rate: 48%) obtained by sticking fine particle carbon black to the surface of the lithium manganate. 2.1 parts by weight of carbon black (HS-100 manufactured by Denki Kagaku Kogyo Kabushiki Kaisha, DBP absorption amount: 140 cm$^3$/100 g) having an average particle diameter of 1 μm and an aspect ratio of 3.8 was then added into 100 parts by weight of ethanol, and they were stirred by T.K. homodisper. Next, 20.4 parts by weight of the CB sticking lithium manganate was added thereto, and they were mixed by the T.K. homodisper. The obtained slurry was evaporated to be dry-cured to obtain a composite material for positive electrodes. Table 3 shows the physical properties of the obtained composite material for positive electrodes.

EXAMPLE 15

A composite material for positive electrodes was obtained by the same method except that #5500 manufactured by Tokai Carbon Co., Ltd. and having an average particle diameter of 2 μm as carbon black added to ethanol was used and lithium manganate having a primary particle diameter of 1.2 μm was used in Example 14. Table 3 shows the physical properties of the obtained composite material for positive electrodes.

EXAMPLE 16

A composite material for positive electrodes was obtained by the same method except that #5500 manufactured by Tokai Carbon Co., Ltd. and having an average particle diameter of 2 μm as carbon black added to ethanol was used and lithium manganate having a primary particle diameter of 10 μm was used in Example 14. Table 3 shows the physical properties of the obtained composite material for positive electrodes.

EXAMPLE 17

A composite material for positive electrodes was obtained by the same method except that #3800 (primary particle diameter: 70 nm) manufactured by Tokai Carbon Co., Ltd. as carbon black added to ethanol was used and lithium manganate having a primary particle diameter of 1.2 μm was used in Example 14. Table 3 shows the physical properties of the obtained composite material for positive electrodes.

EXAMPLE 18

A composite material for positive electrodes was obtained by the same method except that FX-35 (carbon black manufactured by Denki Kagaku Kogyo Kabushiki Kaisha) was used in place of HS-100 in Example 15. Table 3 shows the physical properties of the obtained composite material for positive electrodes.

EXAMPLE 19

A composite material for positive electrodes was obtained by the same method except that ketjen black (carbon black manufactured by Lion Corporation) was used in place of HS-100 in Example 15. Table 3 shows the physical properties of the obtained composite material for positive electrodes.

EXAMPLE 20

A composite material for positive electrodes was obtained by the same method except that FW1 (carbon black manufactured by Degussa Corporation) was used in place of HS-100 in Example 15. Table 3 shows the physical properties of the obtained composite material for positive electrodes.

COMPARATIVE EXAMPLE 4

0.56 part by weight of a polyacrylic acid-based dispersing agent (isobutylene-stearylamide maleate) was added into 100 parts by weight of 2-butanone, and 11.1 parts by weight of carbon black (HS-100 manufactured by Denki Kagaku Kogyo Kabushiki Kaisha, DBP absorption amount: 140 cm$^3$/100 g) having an average particle diameter of 1 μm (primary particle diameter: 45 nm) and an aspect ratio of 3.8 was added thereto to obtain a slurry. This slurry was wet-ground using Dyno-Mill to obtain a carbon black slurry having an average particle diameter of 0.3 μm (primary particle diameter: 45 nm). Next, 25 parts by weight of the obtained fine particle carbon black slurry was added into 80 parts by weight of 2-butanone, and they were ultrasonically dispersed using an ultrasonic type disperser. 20 parts by weight of lithium manganate having a primary particle diameter of 0.8 μm was added into this dispersion liquid, and they were further ultrasonically dispersed. The obtained slurry was evaporated to be dry-cured to obtain a comparative positive electrode material in which the carbon black and the positive electrode active material were compounded. Table 3 shows the physical properties of the obtained material.

COMPARATIVE EXAMPLE 5

2.5 parts by weight of carbon black (HS-100 manufactured by Denki Kagaku Kogyo Kabushiki Kaisha, DBP absorption amount: 140 cm$^3$/100 g) having an average particle diameter of 1 μm (primary particle diameter: 45 nm) and an aspect ratio of 3.8 were added into 100 parts by weight of ethanol and they were stirred. 20 parts by weight of lithium manganate having a primary particle diameter 0.8 μm was added into this liquid, and they were further stirred by T.K. homodisper. The obtained slurry was evaporated to be dry-cured to obtain a comparative positive electrode material in which the positive electrode active material and the carbon black having a high aspect ratio were compounded. Table 3 shows the physical properties of the obtained material.

COMPARATIVE EXAMPLE 6

100 parts by weight of lithium manganate having a primary particle diameter of 0.8 μm, 2 parts by weight of fine particle carbon black (#5500 manufactured by Tokai Carbon Co., Ltd.) having an average particle diameter of 0.8 μm (primary particle diameter: 25 nm), and 10.5 parts by weight of carbon black (HS-100 manufactured by Denki Kagaku Kogyo Kabushiki Kaisha, DBP absorption amount: 140 cm$^3$/100 g) having an average particle diameter of 1 μm (primary particle diameter: 45 nm) and an aspect ratio of 3.8 were dry-mixed in Henschel mixer to obtain a comparative positive electrode material. Table 3 shows the physical properties of the obtained material.

COMPARATIVE EXAMPLE 7

A composite material for positive electrodes was obtained by the same method except that #7550 (carbon black manufactured by Tokai Carbon Co., Ltd.) was used in place of HS-100 in Example 14. Table 3 shows the physical properties of the obtained material.

TABLE 3

| | solvent | dispersing agent | conductive material 1 types | conductive material 1 primary particle diameter (μm) | positive electrode active material | positive electrode active material primary particle diameter (μm) | forcible dispersion |
|---|---|---|---|---|---|---|---|
| Example 12 | ethanol | non-existence | #7550 | 21 | LiMn$_2$O$_4$ | 0.8 | existence |
| Example 13 | 2-butanone | use | HS-100 | 45 (*3) | LiMn$_2$O$_4$ | 0.8 | existence |
| Example 14 | ethanol | non-existence | #5500 | 25 | LiMn$_2$O$_4$ | 0.8 | existence |
| Example 15 | ethanol | non-existence | #5500 | 25 | LiMn$_2$O$_4$ | 1.2 | existence |
| Example 16 | ethanol | non-existence | #5500 | 25 | LiMn$_2$O$_4$ | 10 | existence |
| Example 17 | ethanol | non-existence | #3800 | 70 | LiMn$_2$O$_4$ | 1.2 | existence |
| Example 18 | ethanol | non-existence | #5500 | 25 | LiMn$_2$O$_4$ | 1.2 | existence |

TABLE 3-continued

| | | | | | | | | |
|---|---|---|---|---|---|---|---|---|
| Example 19 | ethanol | non-existence | #5500 | 25 | | LiMn$_2$O$_4$ | 1.2 | existence |
| Example 20 | ethanol | non-existence | #5500 | 25 | | LiMn$_2$O$_4$ | 1.2 | existence |
| Comp. Example 4 | 2-butanone | use | HS-100 | 45 (*3) | | LiMn$_2$O$_4$ | 0.8 | existence |
| Comp. Example 5 | ethanol | non-existence | — | | | LiMn$_2$O$_4$ | 0.8 | non-existence |
| Comp. Example 6 | non-existence | non-existence | #5500 | 25 | | LiMn$_2$O$_4$ | 0.8 | — |
| Comp. Example 7 | ethanol | non-existence | #5500 | 25 | | LiMn$_2$O$_4$ | 0.8 | existence |

| | conductive material 2 | | | | | physical properties | |
|---|---|---|---|---|---|---|---|
| | surface covering rate (%) | types | average particle diameter (μm) | *1 | *2 | compounding process | volume resistivity (Ω·cm) | high-rate discharge characteristics (%) |
| Example 12 | 24 | HS-100 | 1 | 3.8 | 140 | mix deposition composite particles | 2.1 | 61 |
| Example 13 | 32 | HS-100 | 1 | 3.8 | 140 | mix deposition composite particles | 1.8 | 68 |
| Example 14 | 48 | HS-100 | 1 | 3.8 | 140 | mix deposition composite particles | 1.8 | 63 |
| Example 15 | 30 | HS-100 | 1 | 3.8 | 140 | mix deposition composite particles | 1.7 | 70 |
| Example 16 | 30 | HS-100 | 1 | 3.8 | 140 | mix deposition composite particles | 1.6 | 60 |
| Example 17 | 20 | HS-100 | 1 | 3.8 | 140 | mix deposition composite particles | 1.6 | 55 |
| Example 18 | 30 | FX-35 | 5 | 2.2 | 210 | mix deposition composite particles | 1.7 | 70 |
| Example 19 | 30 | ketjen black | 5 | 2.0 | 495 | mix deposition composite particles | 1.7 | 65 |
| Example 20 | 30 | FW1 | 5 | 3.0 | 170 | mix deposition composite particles | 1.7 | 60 |
| Comp. Example 4 | — | — | | | | mix independent particles | 35 | 2 |
| Comp. Example 5 | — | HS-100 | 1 | 3.8 | 140 | mix independent particles | 6.7 | 50 |
| Comp. Example 6 | — | HS-100 | 1 | 3.8 | 140 | mix particles individually | 5.9 | 52 |
| Comp. Example 7 | 48 | #7550 | 1 | 1.1 | 50 | mix deposition composite particles | 10 | 30 |

*1: aspect ratio (—)
*2: DBP absorption amount (cm$^3$/100 g)
*3: after grinding The result of Table 3 shows that any of the composite materials of Examples obtained by mixing the carbon black having the structure constitution with the composite particles in which the conductive material 1 was stuck to the positive electrode active material has low volume resistivity and has excellent high-rate discharge characteristics. On the other hand, Comparative Examples 4 and 5 independently using the conductive material 1 or the carbon black having the structure constitution had high volume resistivity and had insufficient high-rate discharge characteristics. Alternatively, Comparative Example 6 merely mixing both the conductive material 1 and the carbon black had lower improving effects of the volume resistivity and high-rate discharge characteristics.

The invention claimed is:

1. A method for producing a positive electrode for lithium batteries containing a positive electrode active material and a conductive material, the method comprising:
   (Step 1): a step of producing a composite material for positive electrodes of lithium batteries,
   (Step 2): a step of obtaining a slurry containing the composite material for positive electrodes of lithium batteries obtained in Step 1, a solvent, a conductive material and a binder,
   (Step 3): a step of applying the slurry obtained in Step 1 onto a current collector, and
   (Step 4): a step of drying the current collector having the slurry applied thereto and obtained in Step 3,
   wherein Step 1 further comprises:
   (Step 1-1): a dispersing step of dispersing at least the positive electrode active material and the conductive material 1 in a solvent to be in a forcibly dispersed state; and
   (Step 1-2): a composite particle-forming step of obtaining composite particles containing the positive electrode active material and the conductive material 1 by a process for agglutinating the conductive material 1 together with the positive electrode active material in the solvent, wherein
   a conductive material having autoagglutination in the solvent is used as the conductive material 1,
   the content of the conductive material 1 is 0.2 to 5 parts by weight relative to 100 parts by weight of the positive electrode material, and
   the forcibly dispersed state is a dispersion state where when a slurry is sampled and diluted to a predetermined concentration, and an average particle diameter is promptly measured by a particle size distribution measuring device, the average diameter does not surpass 130% of a primary particle diameter of the positive electrode active material.

2. The method according to claim 1, wherein a conductive material containing carbon black having a DBP absorption amount of 200 to 800 $cm^3/100$ g and/or fibrous carbon having an aspect ratio of 50 to 1000 is used as the conductive material 1, and the composite particle-forming step agglutinates the conductive material 1 together with the positive electrode active material in the solvent to obtain the composite particles.

3. The method according to claim 2, wherein the conductive material 1 contains ketjen black having a DBP absorption amount of 200 to 800 $cm^3/100$ g.

4. The method according to claim 2, wherein the fibrous carbon has a fiber diameter of 1 nm to 1 μm.

5. The method according to claim 1, wherein the positive electrode active material has a primary particle diameter of 0.1 to 10 μm.

6. The method according to claim 1, wherein the dispersing step disperses carbon black having a DBP absorption amount of less than 200 $cm^3/100$ g together with the conductive material 1.

7. The method according to claim 1, wherein the composite material for positive electrodes from which the solvent is distilled has a volume resistivity of 3 Ω·cm or less.

8. The method according to claim 1, wherein the composite material for positive electrodes from which the solvent is distilled has a total pore capacity of 0.8 cc/g or more.

9. The method according to claim 1, wherein the positive electrode active material has a primary particle diameter of 0.5 to 10 μm.

10. The method according to claim 1, wherein the solvent in Step 2 is N-methyl-2-pyrolidone.

11. The method according to claim 1, wherein the binder in Step 2 is polyvinylidene difluoride.

12. The method according to claim 1, wherein the conductive material 1 is carbon black having a DBP absorption amount of 200 to 600 $cm^3/100$ g and/or fibrous carbon having an aspect ratio of 50 to 600.

13. A method for producing a positive electrode for lithium batteries containing a positive electrode active material and a conductive material, the method comprising:
   (Step 1): a step of producing a composite material for positive electrodes of lithium batteries,
   (Step 2): a step of obtaining a slurry containing the composite material for positive electrodes of lithium batteries obtained in Step 1, a solvent, and a binder,
   (Step 3): a step of applying the slurry obtained in Step 1 onto a current collector, and
   (Step 4): a step of drying the current collector having the slurry applied thereto and obtained in Step 3,
   wherein Step 1 further comprises:
   (Step 1-1): a dispersing step of dispersing at least the positive electrode active material and the conductive material 1 in a solvent in a forcibly dispersed state;
   (Step 1-2): a composite particle-forming step of obtaining composite particles containing the positive electrode active material and the conductive material 1 by a process for removing the solvent; and
   (Step 1-3): a mixing step of mixing at least the composite particles and a conductive material 2 having an aspect ratio of 2 to 10 after the composite particle-forming step, wherein
   the content of the conductive material 1 is 0.2 to 5 parts by weight relative to 100 parts by weight of the positive electrode material, and
   the forcibly dispersed state is a dispersion state wherein when a slurry is sampled and diluted to a predetermined concentration, and an average particle diameter is promptly measured by a particle size distribution measuring device, the average diameter does not surpass 130% of a primary particle diameter of the positive electrode active material.

14. The method according to claim 13, wherein the conductive material 1 is carbon black having a primary particle diameter of 10 to 100 nm.

15. The method according to claim 13, wherein the solvent has a boiling point of 100° C. or less.

16. The method according to claim 13, wherein the obtained composite material for positive electrodes has a volume resistivity of 5 Ω·cm or less.

17. The method according to claim 13, wherein the compounding amount of the conductive material 2 is 2 to 15 parts by weight relative to 100 parts by weight of the positive electrode active material.

18. The method according to claim 13, wherein the conductive material 2 has the aspect ratio of 2 to 5.

19. The method according to claim 13, wherein the conductive material 2 has the aspect ratio of 2 to 5 and a DBP absorption amount of 100 to 500 cm$^3$/100 g.

20. A method for producing a positive electrode for lithium batteries containing a positive electrode active material and a conductive material, the method comprising:
(Step 1): a step of producing a composite material for positive electrodes of lithium batteries,
(Step 2): a step of obtaining a slurry containing the composite material for positive electrodes of lithium batteries obtained in Step 1, a solvent, and a binder,
(Step 3): a step of applying the slurry obtained in Step 1 onto a current collector, and
(Step 4): a step of drying the current collector having the slurry applied thereto and obtained in Step 3,
wherein Step 1 further comprises:
(Step 1-1): a dispersing step of dispersing at least the positive electrode active material and the conductive material 1 in a solvent in a forcibly dispersed state;
(Step 1-2): a composite particle-forming step for obtaining composite particles containing the positive electrode active material and the conductive material 1 by a process that comprises removing the solvent; and
(Step 1-3): a mixing step of mixing at least the composite particles and a conductive material 2 having a DBP absorption amount of 100 to 500 cm$^3$/100 after the composite particle-forming step, wherein
the content of the conductive material 1 is 0.2 to 5 parts by weight relative to 100 parts by weight of the positive electrode material, and
the forcibly dispersed state is a dispersion state where when a slurry is sampled and diluted to a predetermined concentration, and an average particle diameter is promptly measured by a particle size distribution measuring device, the average diameter does not surpass 130% of a primary particle diameter of the positive electrode active material.

21. The method according to claim 20 wherein the compounding amount of the conductive material 2 is 2 to 15 parts by weight relative to 100 parts by weight of the positive electrode active material.

* * * * *